(12) United States Patent
Ng et al.

(10) Patent No.: US 7,712,910 B2
(45) Date of Patent: May 11, 2010

(54) LOW-PROFILE BACKLIGHT WITH FLEXIBLE LIGHT GUIDE

(75) Inventors: Fook Chuin Ng, Penang (MY); Choon Guan Ko, Penang (MY); Sian Tatt Lee, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 267 days.

(21) Appl. No.: 11/491,850

(22) Filed: Jul. 24, 2006

(65) Prior Publication Data

US 2008/0019117 A1    Jan. 24, 2008

(51) Int. Cl.
*F21V 33/00* (2006.01)
(52) U.S. Cl. .................. 362/85; 362/800; 362/618; 362/619; 362/627; 362/632; 362/278; 362/320; 362/26
(58) Field of Classification Search ............... 362/555, 362/800, 85, 600–634, 26, 109, 278, 320
See application file for complete search history.

(56) References Cited

U.S. PATENT DOCUMENTS

| | | | |
|---|---|---|---|
| 6,247,826 B1 * | 6/2001 | Funamoto et al. ........... | 362/603 |
| 6,825,420 B2 * | 11/2004 | Schreck et al. ........... | 174/117 F |
| 2004/0120140 A1 * | 6/2004 | Fye et al. ................ | 362/84 |
| 2004/0130912 A1 * | 7/2004 | Miyashita ............... | 362/561 |
| 2004/0188639 A1 | 9/2004 | Masuda | |
| 2005/0052732 A1 | 3/2005 | Chen et al. | |
| 2005/0254259 A1 * | 11/2005 | Yamashita et al. ......... | 362/621 |
| 2005/0270783 A1 | 12/2005 | Liu et al. | |
| 2005/0275952 A1 | 12/2005 | Odagiri | |
| 2007/0014097 A1 * | 1/2007 | Park ..................... | 362/26 |
| 2007/0121339 A1 * | 5/2007 | Pan et al. ............... | 362/600 |
| 2007/0147067 A1 * | 6/2007 | Chuang et al. ........... | 362/600 |

* cited by examiner

*Primary Examiner*—Sandra L O'Shea
*Assistant Examiner*—Jessica L McMillan

(57) ABSTRACT

Backlighting methods and apparatuses to backlight a device. The backlighting apparatus includes a flexible light guide, a light source, and a housing. The light source is disposed adjacent to a transmission interface of the flexible light guide to illuminate the flexible light guide. The housing at least partially encloses the flexible light guide and the light source. A surface area of the flexible light guide is visible through the housing. By using a flexible light guide to backlight the device, the size of the device is reduced compared to conventional devices. Alternatively, the device may accommodate additional components. Other advantages also may be achieved.

20 Claims, 5 Drawing Sheets

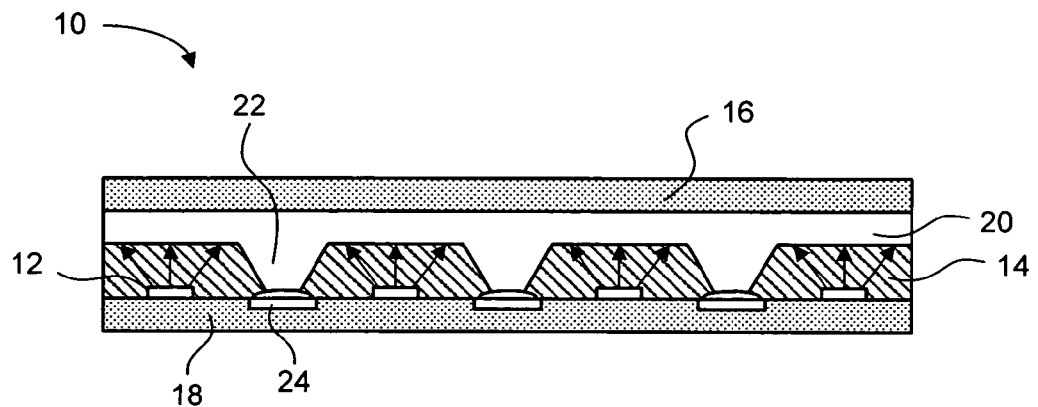
FIG. 1    (Prior Art)
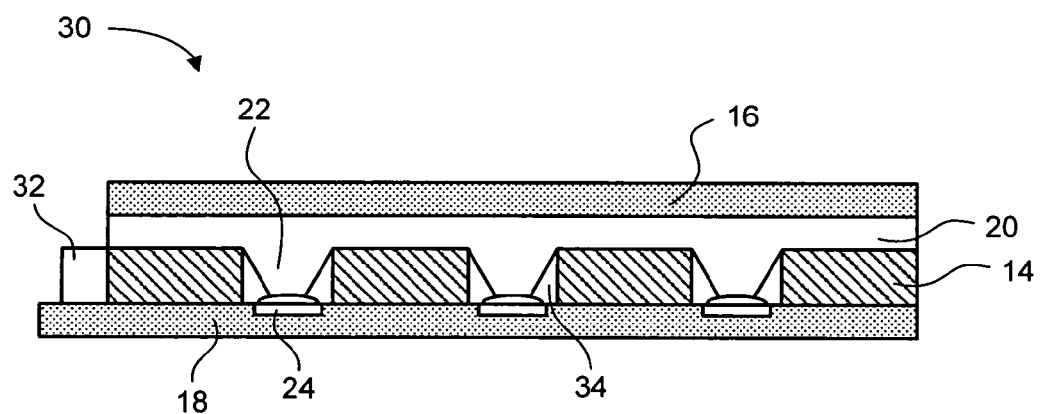
FIG. 2    (Prior Art)

LOW-PROFILE BACKLIGHT WITH FLEXIBLE LIGHT GUIDE

BACKGROUND OF THE INVENTION

Keypad backlighting is currently used in many electronic devices such as mobile phones and personal digital assistants. While current keypad backlighting technologies enhance the visible recognition of individual keys, the current keypad backlighting technologies negatively impact the size and functionality of the devices in which they are used.

FIG. 1 depicts a cross-sectional view of a conventional backlighting system 10 using top-emitting light emitting diodes (LEDs) 12. Specifically, the LEDs 12 are wide-angle, top-emitting, component LEDs 12. The LEDs 12 illuminate a stiff light guide panel 14. The LEDs 12 and light guide panel 14 are disposed within a housing having a top plate 16 and a bottom plate 18. Typically, the light guide panel 14 is punched with holes so that keypad plungers 22 can extend through the light guide panel 14. The keypad plungers 22 are coupled to a plunger layer 20 that is a low optical grade material. When a user pushes a button (not shown) on the keypad, the plunger layer 20 and keypad plunger 22 transfer the tactile contact to a switch 24 within the housing. One type of switch 24 is a metal dome of the type known in the art. Unfortunately, this conventional backlighting system 10 has a disadvantage of creating poor brightness uniformity due to noticeable hot spots from the LEDs 12. Also, the thickness of the top-emitting LEDs ranges between 0.35 to 0.60 mm, thereby adding to the thickness of the backlighting system.

FIG. 2 depicts a cross-sectional view of a conventional backlighting system 30 using side-emitting LEDs 32. This backlighting system 30 includes many of the same components as the backlighting system shown in FIG. 1 and described above. In particular, the backlighting system 30 includes a stiff light guide panel 14, a housing having a top plate 16 and a bottom plate 18, a plunger layer 20, a keypad plunger 22, and a switch 24. The light guide panel 14 of this backlighting system 30 is illuminated by side-emitting LEDs 32. Unfortunately, this conventional backlighting system 30 also has a disadvantage of hot spots from the holes 34 in the light guide panel 14 to accommodate the keypad plungers 22. The holes 34 result in localized hot spots and deteriorate the brightness uniformity performance of the light guide panel. The holes 34 also reduce the tactility of the keypad buttons.

A third type of conventional backlighting system (not shown) uses electroluminescent (EL) lighting. EL lighting systems emit light in response to an electrical current passed through an electroluminescent material. However, the rectifier circuitry in EL backlighting systems generates noise which negatively interferes with other electronic circuitry within the backlit device.

In view of this, what is needed is a backlighting solution to overcome the problems of hotspots, thickness, and noise associated with conventional backlighting technologies.

SUMMARY OF THE INVENTION

A backlighting apparatus is described. One embodiment of the backlighting apparatus includes a flexible light guide, a light source, and a housing. The light source is disposed adjacent to a transmission interface of the flexible light guide to illuminate the flexible light guide. The housing at least partially encloses the flexible light guide and the light source. A surface area of the flexible light guide is visible through the housing. By using a flexible light guide to backlight the device, the size of the device is reduced compared to conventional devices. Alternatively, the device may accommodate additional components. Other advantages also may be achieved.

A method for backlighting is also described. One embodiment of the method includes providing a flexible light guide, providing a light source to illuminate the flexible light guide, and disposing the flexible light guide and the light source within a housing of a backlit device, wherein a surface area of the flexible light guide is visible through the housing. Some embodiments of the method also may include applying a micro-lens coating or a pattern-lens coating to the visible surface area of the flexible light guide, disposing a reflective layer on at least one edge of the flexible light guide, or disposing a diffusion material between the visible surface area of the flexible light guide and an opening in the housing. Some embodiments of the method also may include disposing a plunger on the flexible light guide approximately at the visible surface area to transfer pressure from a tactile contact to a switch disposed within the housing.

Another embodiment of an apparatus to backlight a device is described. One embodiment of the apparatus includes means for illuminating a flexible light guide at a side transmission interface of the flexible light guide and means for providing illumination uniformity within the flexible light guide.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 1 depicts a cross-sectional view of a conventional backlighting system using top-emitting light emitting diodes.

FIG. 2 depicts a cross-sectional view of a conventional backlighting system using side-emitting light emitting diodes.

Throughout the description, similar reference numbers may be used to identify similar elements.

DETAILED DESCRIPTION

Figure 3:
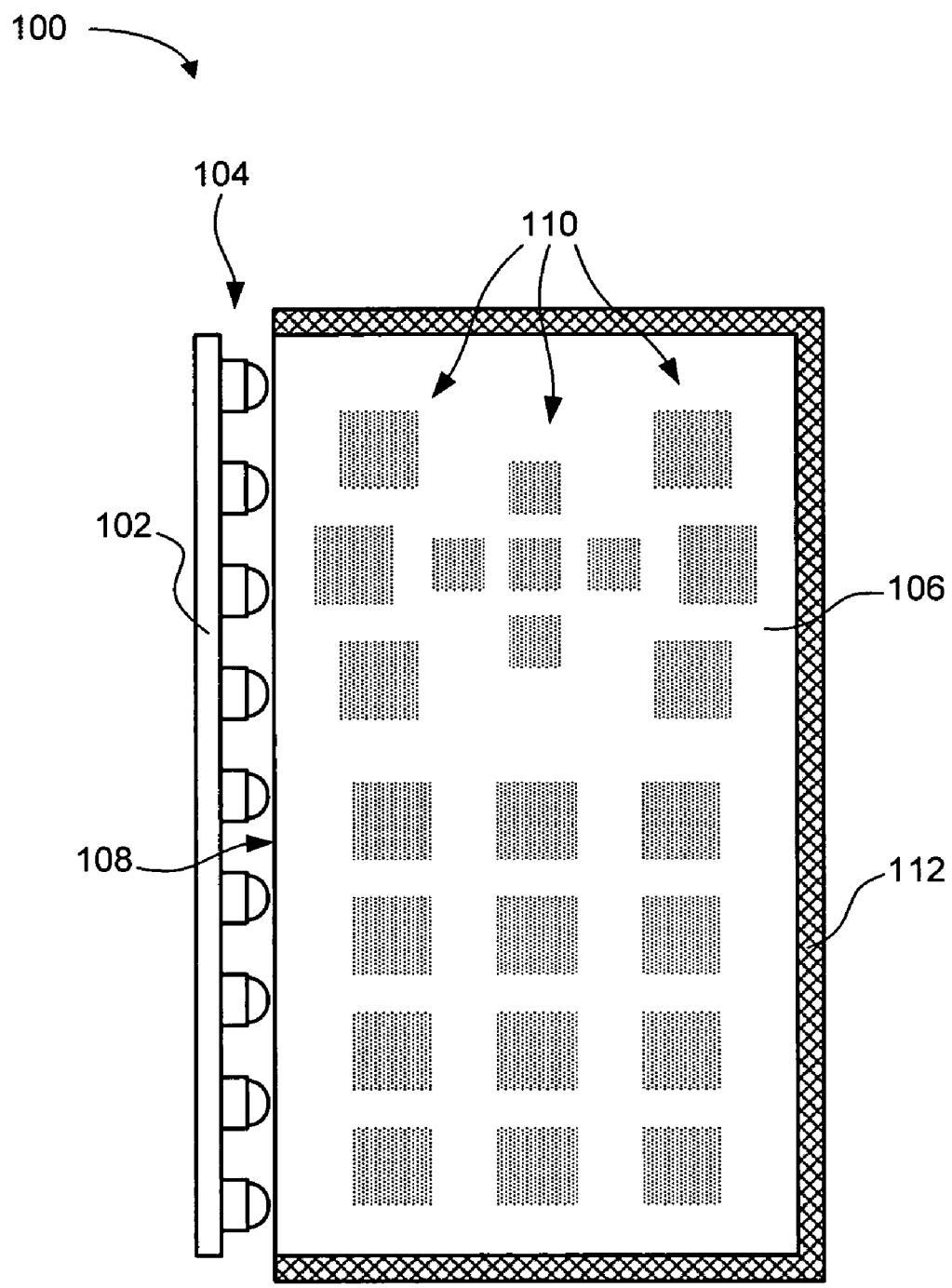
FIG. 3 depicts an embodiment of a backlighting system using a flexible light guide.

FIG. 3 depicts an embodiment of a backlighting system 100 using a flexible light guide 106. The depicted backlighting system 100 is representative of many different types of electronic devices which use or might benefit from a backlit keypad, backlit buttons, or other backlit components. One exemplary electronic device is a mobile telephone having backlit buttons. Another exemplary electronic device is a personal digital assistant (PDA) having a backlit keypad. Other types of electronic devices also my employ the flexible light guide 106 described herein.

The illustrated backlighting system 100 includes a light source 102 to illuminate the flexible light guide 106. In one embodiment, the light source 102 includes multiple light emitting diodes (LEDs) 104. The LEDs 104 may be surface mount technology (SMT) LEDs or another type of LED. Alternatively, the light source 102 may be another type of light source other than LEDs 104. In the depicted embodiment, the LEDs 104 are disposed adjacent to a transmission interface 108 of the flexible light guide 106. Light from the LEDs 104 propagates into the light guide 106 to illuminate one or more backlit components 110 such as a keypad or other buttons. In order to enhance the backlighting of the buttons 110, a micro-lens coating or pattern-lens coating may be applied to the flexible light guide 106. Additional details of micro-lens coatings and pattern-lens coatings are shown and described with reference to FIGS. 4 and 5.

In one embodiment, the flexible light guide 106 is fabricated using an elastomer material such as an ultra-thin elastomer. For example, the flexible light guide 106 may be fabricated using polyurethane. However, other flexible materials may be used in conjunction with or instead of an elastomer material. Additionally, the flexible light guide 106 may be fabricated using a high optical grade material or, alternatively, a low optical grade material. A high optical grade material transmits the light with less loss than a low optical grade material. Also, the light uniformity and brightness may be affected by the optical transmission quality of the flexible light guide 106. In another embodiment, the flexible light guide 106 may be fabricated using a material or coating which is waterproof or water-resistant. For example, one type of waterproof material that may be used to fabricate a flexible light guide 106 is fluorocarbon. Where a waterproof or water-resistant material is used, the flexible light guide 106 may provide structural and environmental protection for the backlighting system 100.

In another embodiment, a reflective layer 112 may be coupled to or integrated with the flexible light guide 106. For example, the reflective layer 112 may be applied to one or more surfaces of the flexible light guide 106 using an adhesive material. In another example, the reflective layer 112 may be integrated with the adhesive applied to the flexible light guide 106. In another embodiment, the reflective layer 112 may be integrated with the elastomer of the flexible light guide 106. Although the reflective layer 112 is shown on the outer edges of the flexible light guide 106, other embodiments may include the reflective layer on more or less surfaces of the flexible light guide 106. For example, the reflective layer may be applied to the front surface (except for the buttons) of the flexible light guide.

Figure 4:
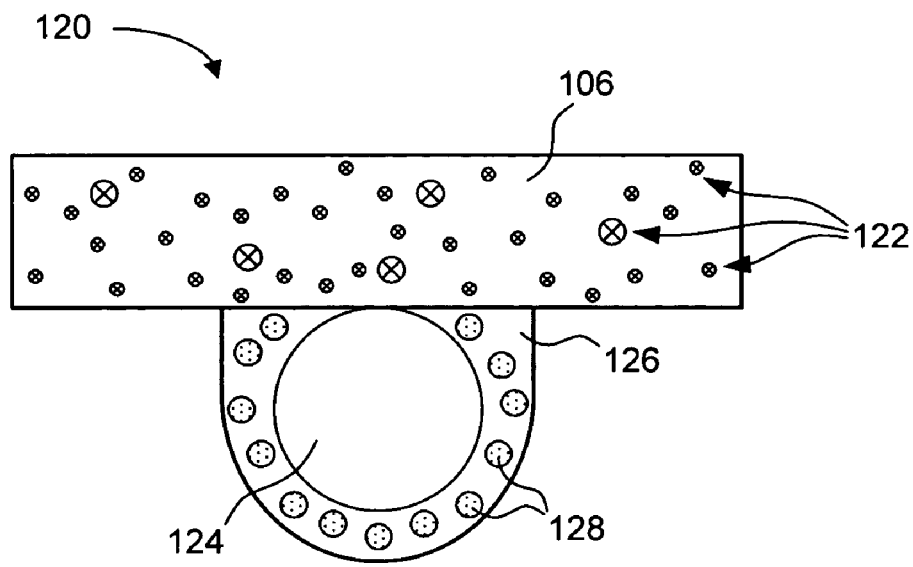
FIG. 4 depicts an embodiment of a micro-lens coating assembly.

FIG. 4 depicts an embodiment of a micro-lens coating assembly 120. The illustrated micro-lens coating assembly 120 includes the flexible light guide 106. In one embodiment, the flexible light guide 106 includes embedded diffusion particles 122 to diffuse the light as it transmits through the flexible light guide 106. Alternatively, a separate diffusion layer which is independent of the flexible light guide 106 may be provided. A micro-lens 124 is coupled to the flexible light guide 106. In one embodiment, a coating resin 126 may be used to couple the micro-lens 124 to the flexible light guide 106. The coating resin 126 may include reflection pigment 128 to enhance the light propagation associated with the micro-lens 124 and the flexible light guide 106.

Figure 5:
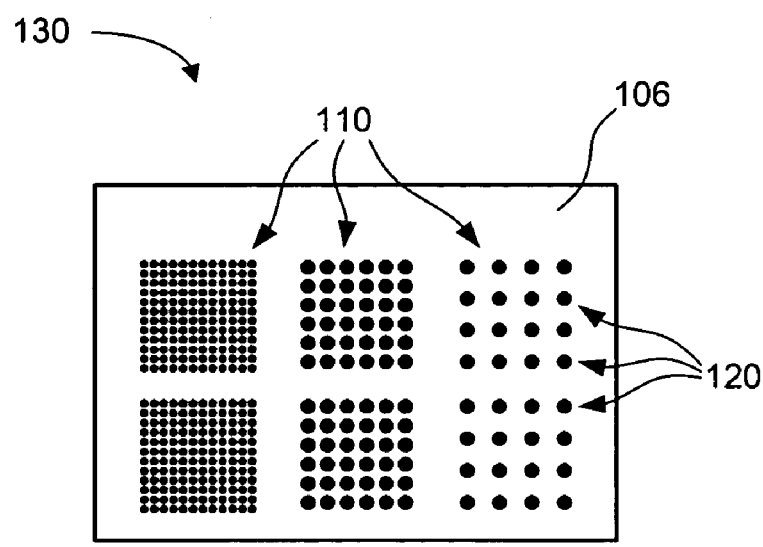
FIG. 5 depicts an embodiment of a pattern-lens coating.

FIG. 5 depicts an embodiment of a pattern-lens coating 130. The term pattern lens coating 130 may refer to the pattern of micro-lens assemblies 120 used to demarcate an individual buttons 110 or other components. Additionally, the term pattern lens coating 130 may refer to the overall pattern of localized micro-lens assemblies 120 and components laid out on the flexible light guide 106. The illustrated pattern lens coating 130 includes six localized groups of micro-lens assemblies 120. In some embodiments, the distinct groups of micro-lens assemblies 120 may be distributed more or less densely than other groups of micro-lens assemblies 120. Additionally, the pattern lens coating 130 of individual buttons 110 may include micro-lens assemblies 120 distributed in evenly spaced patterns, randomly spaced patterns, or other types of distributions.

One exemplary micro-lens coating 120 and pattern-lens coating 130 is manufactured by Toyo Condenser Co., LTD., of Shizuoka, Japan. In one embodiment, the micro-lens coating 120 and the pattern-lens coating 130 are applied to an underside of the flexible light guide 106 to facilitate uniform light distribution within the flexible light guide 106. In another embodiment, the micro-lens coating 120 is localized at the locations of the individual buttons 110. In another embodiment, the micro-lens coating 120 has a variable distribution with a different distribution of density according to where the LEDs 104 of the light source 102 are disposed.

Figure 6:
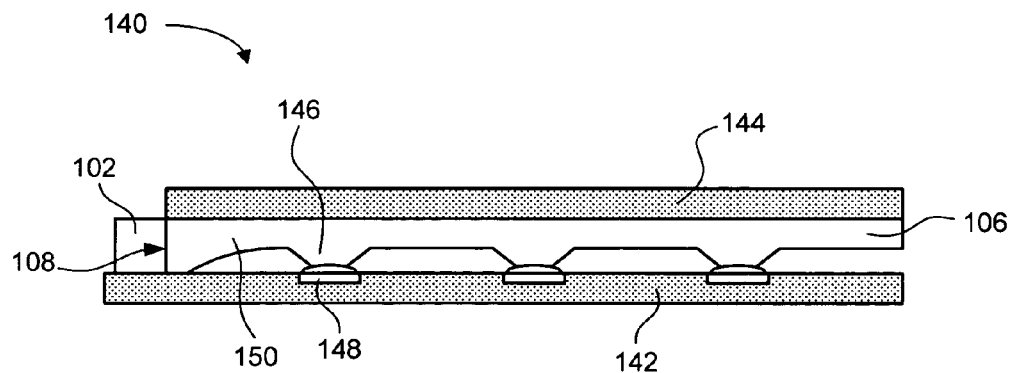
FIG. 6 depicts a cross-sectional view of an embodiment of a backlighting system using a flexible light guide.

FIG. 6 depicts a cross-sectional view of an embodiment of a backlighting system 140 using a flexible light guide 106. The illustrated backlighting system 140 includes a light source 102 such as a plurality of LEDs 104. The light source 102 is disposed adjacent to the flexible light guide 106 to illuminate the flexible light guide 106 through the transmission interface 108 of the flexible light guide 106. The flexible light guide 106 is disposed within a housing having a back plate 142 and a front plate 144. The terms "back" and "front" are used in a non-limiting manner to merely designate the button-side (front) and the non-button-side (back) of the flexible light guide 106. Thus the use of the terms "back" and "front" are not intended to imply or require any specific orientation of the backlighting system 140 during manufacturing, use, or other handling of the backlighting system 140. In one embodiment, the light source 102 is mounted to the back plate 142 of the housing.

In the illustrated backlighting system 140, the flexible light guide 106 includes one or more integrated plungers 146. The integrated plungers 146 are also referred to as keypad plungers 146. In one embodiment, the integrated plungers 146 are integrally formed with the flexible light guide 106. The integrated plungers 146 may be fabricated, for example, by adding a specific hardness material to the elastomer of the flexible light guide 106. One example of a specific hardness material is peroxide crosslinking agent. In one embodiment, the specific hardness material may be added to the elastomer of the flexible light guide 106 after the micro-lens coating 120 and pattern-lens coating 130 are applied to the flexible light guide 106. The integrated plungers 146 protrude from the flexible light guide 106 to contact corresponding switches 148. In one embodiment, the switches 148 are metal domes of the type known in the art. Alternatively, the switches 148 may be another type of switch.

In one embodiment, the flexible light guide 106 also includes a tapered section or portion 150 near the transmission interface 108. The tapered section 150 facilitates enhanced light coupling from the light source 102 to the flexible light guide 106. In particular, the tapered section 150 may use total internal reflection to limit or eliminate light loss from the flexible light guide 106. In this way, the brightness of the buttons 110 may be increased or maximized.

Figure 7:
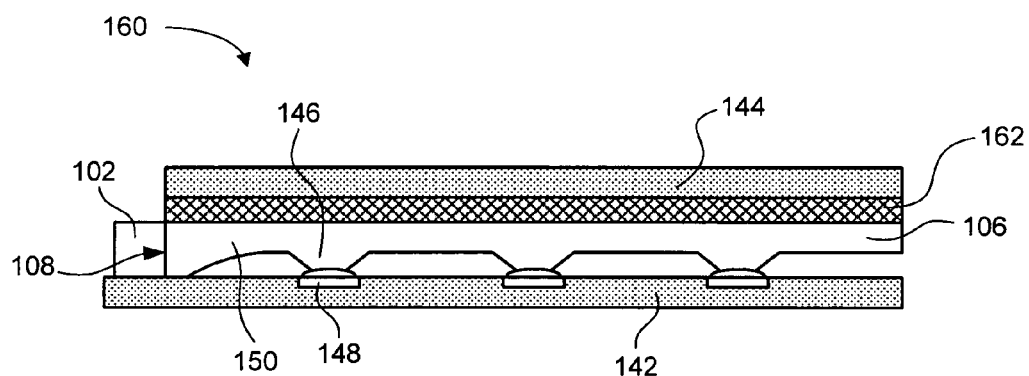
FIG. 7 depicts a cross-sectional view of another embodiment of a backlighting system using a flexible light guide.

FIG. 7 depicts a cross-sectional view of another embodiment of a backlighting system 160 using a flexible light guide 106. The illustrated backlighting system 160 is substantially similar to the backlighting system 140 of FIG. 6. However, the backlighting system 160 of FIG. 7 includes a diffusion layer 162 interposed between the flexible light guide 106 and the front plate 144. The diffusion layer 162 facilitates diffusion of the light from the flexible light guide 106. The diffusion layer 162 also helps to improve light output uniformity to the front plate 144. Additionally, the diffusion layer 162 may obscure components such as the switches 148 underneath the diffusion layer 162 so that they are not visible through the diffusion layer 162.

Figure 8:
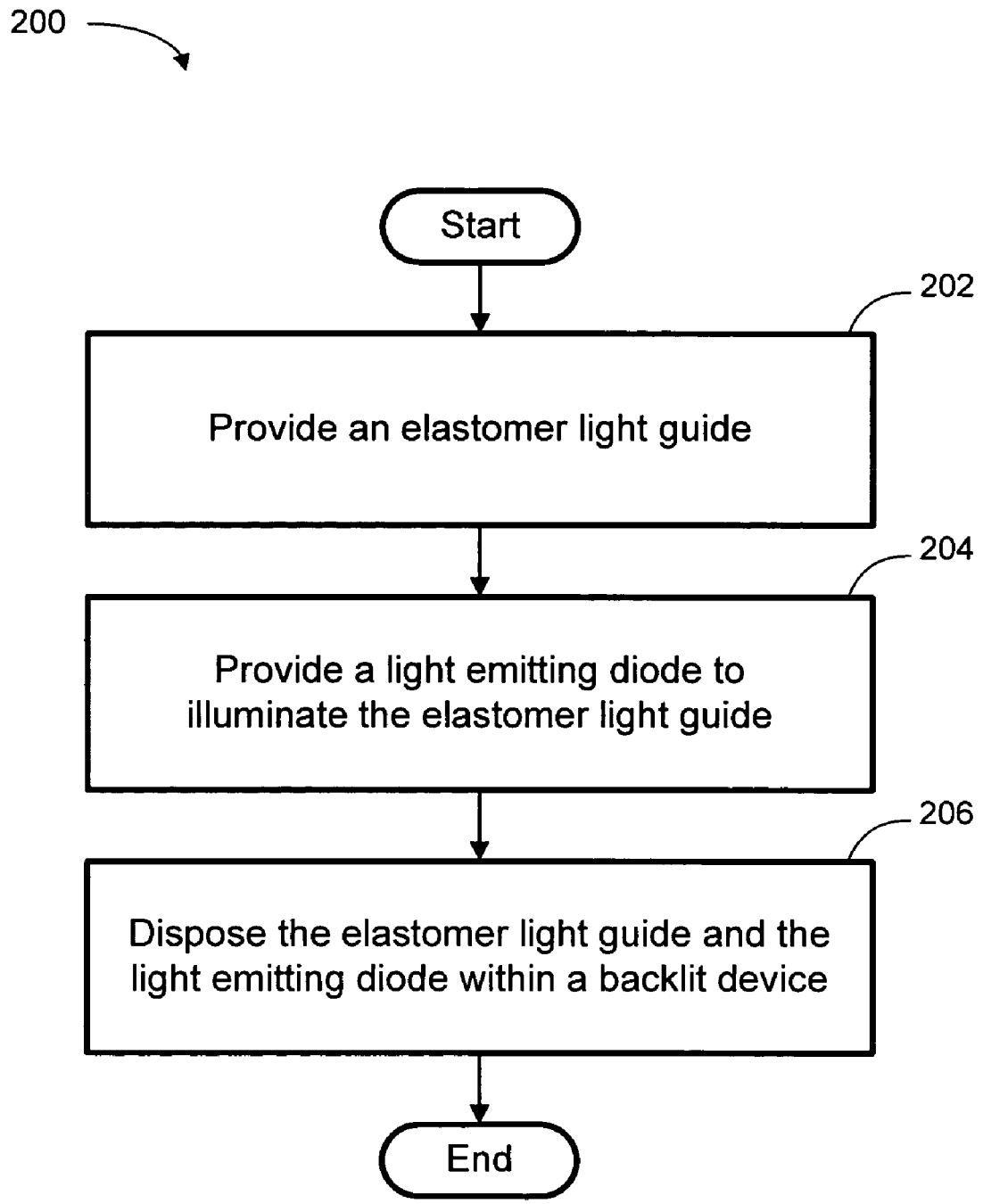
FIG. 8 is a process flow diagram of a backlighting method which may be used in conjunction with the flexible light guide of the backlighting system.

FIG. 8 is a process flow diagram of a backlighting method 200 which may be used in conjunction with the flexible light guide 106 of the backlighting system 100. Similarly, the backlighting method 200 may be used in conjunction with other backlighting systems such as the backlighting systems 140 and 160. At block 202, an elastomer light guide is provided. The elastomer light guide is one type of flexible light guide 106. In other embodiments, other types of flexible light guides 106 may be provided.

At block 204, an LED 104 is provided to illuminate the elastomer light guide. Alternatively, other types of light sources 102 may be used to illuminate the flexible light guide 106. At block 206, the elastomer light guide and the LED 104 are disposed within a backlit device. As one example, the flexible light guide 106 and the light source 102 are disposed within the backlighting system 140.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The embodiments described herein present one or more advantages compared to conventional backlighting systems. However, some of the embodiments may have other advantages or less than all of the advantages described herein. Some embodiments produce good light uniformity so that hot spots are not present within the flexible light guide 106. Some embodiments use a light source 102 that does not produce noise (e.g., noise from rectifier circuitry). Some embodiments facilitate a reduced thickness of the electronic device by using a relatively thin flexible light guide 106. For example, the flexible light guide 106 may be approximately 2 millimeters (mm), and the plunger height may be approximately 2 mm, so that the total distance between the back plate 142 and the front plate 144 is about 4 mm. Other embodiments may be thinner or less thin than this example. Some embodiments implement integrated plungers 146 to facilitate contact with the corresponding switches 148. Some embodiments implement a flexible light guide 106 that also serves as a waterproof or water resistant barrier for the electronic device.

Although specific embodiments of the invention have been described and illustrated, the invention is not to be limited to the specific forms or arrangements of parts so described and illustrated. The scope of the invention is to be defined by the appended claims and their equivalents.

What is claimed is:

1. A backlighting apparatus comprising:
   a flexible light guide comprising embedded diffusion particles within the flexible light guide;
   a light source disposed adjacent to a transmission interface of the flexible light guide to illuminate the flexible light guide, wherein the embedded diffusion particles are at least partially below a surface of the flexible light guide;
   a housing to at least partially enclose the flexible light guide and the light source, wherein a surface area of the flexible light guide is visible through the housing; and
   a micro-lens coating applied to the flexible light guide at a location corresponding to the surface area.

2. The backlighting apparatus of claim 1 further comprising a pattern-lens coating applied to the flexible light guide at a location corresponding to the surface area.

3. The backlighting apparatus of claim 1 further comprising a reflective layer disposed on at least one edge of the flexible light guide, wherein the at least one edge is other than the transmission interface of the flexible light guide.

4. The backlighting apparatus of claim 1 further comprising a diffusion material disposed between the visible surface area of the flexible light guide and an opening in the housing, wherein the diffusion material is separate from the flexible light guide.

5. The backlighting apparatus of claim 1 wherein the flexible light guide comprises a high optical grade elastomer light guide.

6. The backlighting apparatus of claim 1 wherein the flexible light guide comprises a tapered section to limit light loss from the light source to the flexible light guide.

7. The backlighting apparatus of claim 1 wherein the backlighting apparatus comprises a keyboard, a keypad, a touchpad, a mobile telephone, a personal digital assistant, or a remote controller.

8. The backlighting apparatus of claim 1 wherein the light source comprises a side-emitting light emitting diode.

9. The backlighting apparatus of claim 1 wherein the flexible light guide comprises a plunger to transfer pressure from a tactile contact approximately at the visible surface area of the flexible light guide to a switch disposed within the housing, wherein the plunger is integrally formed with the flexible light guide.

10. The backlighting apparatus of claim 1 wherein the micro-lens coating further comprises a resin to couple the micro-lens to the flexible light guide, the resin comprising reflection pigment to enhance the light propagation associated with the micro-lens and the flexible light guide.

11. A method for backlighting comprising:
    providing a flexible light guide comprising embedded diffusion particles within the flexible light guide, wherein the embedded diffusion particles are at least partially below a surface of the flexible light guide;
    providing a light source to illuminate the flexible light guide;
    disposing the flexible light guide and the light source within a housing of a backlit device, wherein a surface area of the flexible light guide is visible through the housing; and
    applying a micro-lens coating to the flexible light guide at a location corresponding to the surface area.

12. The method of claim 11 further comprising applying a pattern-lens coating to the flexible light guide at a location corresponding to the surface area.

13. The method of claim 11 further comprising transmitting light from the light source through a transmission interface of the flexible light guide to backlight the visible surface area.

14. The method of claim 13 further comprising disposing a reflective layer on at least one edge of the flexible light guide, other than the transmission interface, to reflect light from the flexible light guide back into the flexible light guide.

15. The method of claim 11 disposing a diffusion material between the visible surface area of the flexible light guide and an opening in the housing, wherein the diffusion material is separate from the flexible light guide.

16. The method of claim 11 further comprising disposing a plunger on the flexible light guide approximately at the visible surface area to transfer pressure from a tactile contact to a switch disposed within the housing.

17. The method of claim 11 wherein the flexible light guide comprises an elastomer light guide having a tapered section to limit light loss from the light source to the flexible light guide, and the light source comprises a side-emitting, surface mount technology light emitting diode.

18. The method of claim 11 wherein the light source comprises a side-emitting light emitting diode.

19. The method of claim 11 wherein the flexible light guide comprises a plunger to transfer pressure from a tactile contact approximately at the visible surface area of the flexible light guide to a switch disposed within the housing, wherein the plunger is integrally formed with the flexible light guide.

20. The method of claim 11 wherein the micro-lens coating further comprises a resin to couple the micro-lens to the flexible light guide, the resin comprising reflection pigment to enhance the light propagation associated with the micro-lens and the flexible light guide.

* * * * *